(12) United States Patent
Patten

(10) Patent No.: US 9,242,190 B2
(45) Date of Patent: Jan. 26, 2016

(54) METHODS AND SYSTEMS FOR REMOVING FINES FROM HYDROCARBON-CONTAINING FLUIDS

(75) Inventor: James W. Patten, Sandy, UT (US)

(73) Assignee: Red Leaf Resources, Inc., South Jordan, UT (US)

(*) Notice: Subject to any disclaimer, the term of this patent is extended or adjusted under 35 U.S.C. 154(b) by 1172 days.

(21) Appl. No.: 12/960,215

(22) Filed: Dec. 3, 2010

(65) Prior Publication Data

US 2011/0297587 A1 Dec. 8, 2011

Related U.S. Application Data

(60) Provisional application No. 61/266,423, filed on Dec. 3, 2009.

(51) Int. Cl.
*B01D 15/00* (2006.01)
*B01J 20/02* (2006.01)
*B01J 20/22* (2006.01)

(52) U.S. Cl.
CPC .............. *B01D 15/00* (2013.01); *B01J 20/02* (2013.01); *B01J 20/22* (2013.01); *C10G 2300/201* (2013.01)

(58) Field of Classification Search
CPC ........ B01D 15/00; B01D 23/00; B01D 37/00; C10G 25/00
USPC .......................................................... 210/807
See application file for complete search history.

(56) References Cited

U.S. PATENT DOCUMENTS

| | | | |
|---|---|---|---|
| 1,523,942 A * | 1/1925 | Forwood et al. ............... | 208/408 |
| 1,919,636 A | 7/1933 | Karrick | |
| 1,945,583 A * | 2/1934 | Wietzel et al. ................ | 208/307 |
| 2,481,051 A | 9/1949 | Uren | |
| 2,789,695 A | 1/1957 | Winkler | |
| 3,617,471 A | 11/1971 | Schlinger et al. | |
| 3,652,447 A | 3/1972 | Yant et al. | |

(Continued)

FOREIGN PATENT DOCUMENTS

| CN | 1359749 A | 7/2002 |
|---|---|---|
| CN | 1956768 | 5/2007 |

(Continued)

OTHER PUBLICATIONS

U.S. Appl. No. 12/701,156, filed Feb. 5, 2010; Todd Dana; office action issued Mar. 12, 2012.

(Continued)

*Primary Examiner* — Michelle Stein
(74) *Attorney, Agent, or Firm* — Thorpe North & Western, LLP

(57) ABSTRACT

A method of removing fines from a hydrocarbon-containing fluid can include preparing a bed media of particulate earthen material (12). The hydrocarbon-containing fluid having fines therein can be passed through the bed media (12) at a flow rate such that a portion of the fines are retained in the bed media (12) to form a filtered hydrocarbon-containing fluid. The flow rate is sufficient to maintain a wetting film of the hydrocarbon-containing fluid across at least a majority portion of the particulate earthen material which is contacted by the hydrocarbon-containing fluid. The filtered hydrocarbon-containing fluid can be recovered from the bed media (12) via a suitable outlet (16) having substantially reduced or eliminated fines content.

21 Claims, 2 Drawing Sheets

(56) References Cited

U.S. PATENT DOCUMENTS

| | | | |
|---|---|---|---|
| 3,661,423 A | 5/1972 | Garret | |
| 3,684,816 A | 8/1972 | Reighter | |
| 3,910,834 A | 10/1975 | Anderson | |
| 3,919,390 A | 11/1975 | Moore | |
| 3,954,140 A | 5/1976 | Hendrick | |
| 4,017,119 A | 4/1977 | Lewis | |
| 4,029,571 A | 6/1977 | Curtin | |
| 4,043,595 A | 8/1977 | French | |
| 4,089,375 A | 5/1978 | Cha | |
| 4,096,912 A | 6/1978 | Lewis et al. | |
| 4,106,814 A | 8/1978 | French | |
| 4,133,580 A | 1/1979 | French | |
| 4,151,068 A | 4/1979 | McCollum et al. | |
| 4,155,967 A | 5/1979 | South et al. | |
| 4,158,622 A | 6/1979 | Schwarzenbek | |
| 4,171,146 A | 10/1979 | Hard | |
| 4,174,751 A | 11/1979 | Compton | |
| 4,199,327 A | 4/1980 | Hempill et al. | |
| 4,219,237 A | 8/1980 | Sisemore | |
| 4,221,648 A | 9/1980 | Martin | |
| 4,230,557 A * | 10/1980 | Bertelsen et al. | 208/411 |
| 4,234,230 A | 11/1980 | Weichman | |
| 4,241,952 A | 12/1980 | Ginsburgh | |
| 4,266,612 A | 5/1981 | French | |
| 4,266,826 A | 5/1981 | French | |
| 4,294,563 A | 10/1981 | Kilburn | |
| 4,303,533 A | 12/1981 | Fremont | |
| 4,353,418 A | 10/1982 | Hoekstra et al. | |
| 4,376,107 A | 3/1983 | Morgenthaler | |
| 4,404,085 A * | 9/1983 | York et al. | 208/409 |
| 4,415,365 A | 11/1983 | Spars et al. | |
| 4,423,907 A | 1/1984 | Ridley | |
| 4,424,021 A | 1/1984 | Merrill, Jr. | |
| 4,430,195 A | 2/1984 | Oltrogge | |
| 4,440,446 A | 4/1984 | Hutchins | |
| 4,449,586 A | 5/1984 | Urban et al. | |
| 4,452,689 A | 6/1984 | Russum | |
| 4,454,915 A | 6/1984 | York et al. | |
| 4,469,805 A | 9/1984 | Kofke | |
| 4,502,920 A | 3/1985 | Edwards | |
| 4,851,134 A | 7/1989 | Bennoit et al. | |
| 4,879,019 A | 11/1989 | Ward | |
| 4,984,594 A | 1/1991 | Vinegar et al. | |
| 5,024,487 A | 6/1991 | Woestemeyer et al. | |
| 5,041,209 A | 8/1991 | Cha et al. | |
| 5,076,727 A | 12/1991 | Johnson et al. | |
| 5,114,497 A | 5/1992 | Johnson et al. | |
| 5,137,539 A | 8/1992 | Bowling | |
| 5,139,535 A | 8/1992 | Strickland et al. | |
| 5,190,405 A | 3/1993 | Vinegar et al. | |
| 5,193,934 A | 3/1993 | Johnson et al. | |
| 5,221,827 A | 6/1993 | Marsden et al. | |
| 5,229,583 A | 7/1993 | Van Egmond et al. | |
| 5,244,310 A | 9/1993 | Johnson | |
| 5,271,693 A | 12/1993 | Johnson et al. | |
| 5,318,116 A | 6/1994 | Vinegar et al. | |
| 5,340,467 A | 8/1994 | Gregoli et al. | |
| 5,372,621 A | 12/1994 | Staton | |
| 5,372,708 A | 12/1994 | Gewertz | |
| 5,478,443 A | 12/1995 | Cogat | |
| 5,543,041 A | 8/1996 | Okazaki et al. | |
| 5,553,189 A | 9/1996 | Stegemeier et al. | |
| 5,656,239 A | 8/1997 | Stegemeier et al. | |
| 5,660,500 A | 8/1997 | Marsden, Jr. et al. | |
| 5,674,424 A | 10/1997 | Iben et al. | |
| 5,843,214 A | 12/1998 | Janes | |
| 5,868,202 A | 2/1999 | Hsu | |
| 5,948,253 A | 9/1999 | Hearn | |
| 5,997,214 A | 12/1999 | De Rouffignac et al. | |
| 5,997,732 A | 12/1999 | Yenni | |
| 6,051,137 A | 4/2000 | Deskins | |
| 6,102,622 A | 8/2000 | Vinegar et al. | |
| 6,110,359 A | 8/2000 | Davis et al. | |
| 6,419,423 B1 | 7/2002 | Vinegar et al. | |
| 6,485,232 B1 | 11/2002 | Vinegar et al. | |
| 6,543,535 B2 | 4/2003 | Converse et al. | |
| 6,543,539 B1 | 4/2003 | Vinegar et al. | |
| 6,632,047 B2 | 10/2003 | Vinegar et al. | |
| 6,732,796 B2 | 5/2004 | Vinegar et al. | |
| 6,811,683 B2 | 11/2004 | Davis et al. | |
| 6,824,328 B1 | 11/2004 | Vinegar et al. | |
| 6,841,077 B2 | 1/2005 | Gannon et al. | |
| 6,854,929 B2 | 2/2005 | Vinegar et al. | |
| 6,875,356 B2 | 4/2005 | Perriello | |
| 6,881,009 B2 | 4/2005 | Stegemeier et al. | |
| 6,902,138 B2 | 6/2005 | Vantouroux | |
| 6,918,443 B2 | 7/2005 | Wellington et al. | |
| 6,923,257 B2 | 8/2005 | Wellington et al. | |
| 6,929,330 B2 | 8/2005 | Drake et al. | |
| 6,951,247 B2 | 10/2005 | De Rouffignac et al. | |
| 6,962,466 B2 | 11/2005 | Vinegar et al. | |
| 6,991,033 B2 | 1/2006 | Wellington et al. | |
| 7,004,247 B2 | 2/2006 | Cole et al. | |
| 7,004,251 B2 | 2/2006 | Ward et al. | |
| 7,004,678 B2 | 2/2006 | Stegemeier et al. | |
| 7,032,660 B2 | 4/2006 | Vinegar et al. | |
| 7,040,397 B2 | 5/2006 | De Rouffignac et al. | |
| 7,040,399 B2 | 5/2006 | Wellington et al. | |
| 7,048,051 B2 | 5/2006 | McQueen | |
| 7,051,811 B2 | 5/2006 | De Rouffignac et al. | |
| 7,066,254 B2 | 6/2006 | Vinegar et al. | |
| 7,070,758 B2 | 7/2006 | Peterson | |
| 7,073,578 B2 | 7/2006 | Vinegar et al. | |
| 7,077,198 B2 | 7/2006 | Vinegar et al. | |
| 7,077,199 B2 | 7/2006 | Vinegar et al. | |
| 7,090,013 B2 | 8/2006 | Wellington | |
| 7,091,460 B2 | 8/2006 | Kinzer | |
| 7,114,566 B2 | 10/2006 | Vinegar et al. | |
| 7,121,342 B2 | 10/2006 | Vinegar et al. | |
| 7,534,926 B2 | 5/2009 | Stegemeier et al. | |
| 7,862,705 B2 | 1/2011 | Dana et al. | |
| 7,862,706 B2 | 1/2011 | Dana et al. | |
| 2003/0047522 A1 | 3/2003 | Gannon et al. | |
| 2004/0211569 A1 | 10/2004 | Vinegar et al. | |
| 2006/0213657 A1 | 9/2006 | Verchenko et al. | |
| 2007/0000662 A1 | 1/2007 | Symington et al. | |
| 2007/0023186 A1 | 2/2007 | Kaminsky et al. | |
| 2008/0077430 A1 | 3/2008 | Singer et al. | |
| 2008/0190813 A1 | 8/2008 | Dana | |
| 2008/0190815 A1 | 8/2008 | Dana | |
| 2008/0190816 A1 | 8/2008 | Dana | |
| 2008/0190818 A1 | 8/2008 | Dana | |
| 2009/0007484 A1 | 1/2009 | Smith | |
| 2009/0250380 A1 | 10/2009 | Dana | |
| 2010/0200465 A1 | 8/2010 | Dana | |
| 2010/0200467 A1 | 8/2010 | Dana | |
| 2011/0138649 A1 | 6/2011 | Patten | |

FOREIGN PATENT DOCUMENTS

| | | |
|---|---|---|
| GB | 339681 A | 12/1930 |
| JP | 2005-306721 | 11/2005 |
| JP | 2009/090168 | 4/2009 |
| KR | 10-0595792 | 7/2006 |
| WO | WO 90/06161 | 6/1990 |
| WO | WO 2008/098177 | 8/2008 |

OTHER PUBLICATIONS

Slow Sand Filter; http://en.wikipedia.org/wiki/Slow_sand_filter; Nov. 9, 2009; 4 pages.

Sand Filter; http://en.wikipedia.org/wiki/Sand_filter; Nov. 9, 2009; 6 pages.

Alternative Methods for Fluid Delivery and Recovery; Manual; Sep. 1994; United States Environmental Protection Agency; 87 pages.

Related Case: U.S. Appl. No. 12/984,394, filed Jan. 4, 2011; Todd Dana.

U.S. Appl. No. 12/984,394, filed Jan. 4, 2011; Todd Dana; office action issued Jun. 1, 2011.

U.S. Appl. No. 12/703,560, filed Feb. 10, 2010; Todd Dana; office action issued Apr. 24, 2012.

U.S. Appl. No. 12/701,156, filed Feb. 5, 2010; Todd Dana; notice of allowance dated Jul. 30, 2012.

(56) References Cited

OTHER PUBLICATIONS

U.S. Appl. No. 12/703,560, filed Feb. 10, 2010; Todd Dana; notice of allowance dated Sep. 4, 2012.
PCT Application PCT/US2010/060854; filed Dec. 16, 2010; James W. Patten; International Search Report mailed Aug. 26, 2011.
PCT Application PCT/US2010/058948; filed Dec. 3, 2010; James W. Patten; International Search Report mailed Aug. 31, 2011.
U.S. Appl. No. 12/703,560, filed Feb. 10, 2010; Todd Dana; office action issued Nov. 18, 2011.
U.S. Appl. No. 12/984,394, filed Jan. 4, 2011; Todd Dana; notice of allowance issued Oct. 26, 2011.
U.S. Appl. No. 12/970,005, filed Dec. 16, 2010; James W. Patten; office action dated Feb. 11, 2014.

\* cited by examiner

METHODS AND SYSTEMS FOR REMOVING FINES FROM HYDROCARBON-CONTAINING FLUIDS

RELATED APPLICATION

This application claims priority to U.S. Provisional Application No. 61/266,423, filed Dec. 3, 2009, which is incorporated here by reference.

BACKGROUND OF THE INVENTION

Many hydrocarbon recovery processes leave residual fines in the hydrocarbon product or outlet streams. The fines are most prominent in processes which involve direct production of hydrocarbon fluids from a mined material such as oil shale, coal or tar sands. Other sources of fines can include catalyst material used in hydroprocessing, hydrocracking and/or other upgrading processes. These fines are often detrimental to future use of such hydrocarbon fluids containing these fines. Typical approaches for removing fines from these fluids can include flocculation, settling, filtration and the like. However, effective removal of fines from these fluids remains a challenge. For example, extensive effort is made to remove fines from shale oil and other hydrocarbons refined from crude oils commonly using filtration. In tar sand recovery operations, a large volume of caustic tailings is produced. These tailings include caustic with some bitumen and fines suspended in the waste stream. Currently, these tailings are merely allowed to settle in large settling ponds. Effective settling of the suspended fines can take decades or centuries in some cases to dewater. Although some efforts are being made to improve options for treatment of caustic tailings, no economically effective options appear to be available.

For these and other reasons, the need remains for methods and systems which can enable substantial removal of fines from hydrocarbon-containing fluids in a cost effective manner.

SUMMARY

A method of removing fines from a hydrocarbon-containing fluid can include preparing a bed media of particulate earthen material. The hydrocarbon-containing fluid having fines therein can be passed through the bed media at a flow rate such that a portion of the fines are retained in the bed media to form a filtered hydrocarbon-containing fluid. The flow rate is sufficient to maintain a wetting film of the hydrocarbon-containing fluid across at least a majority portion of the particulate earthen material which is contacted by the hydrocarbon-containing fluid. The filtered hydrocarbon-containing fluid can be recovered from the bed media.

The bed media can be the hydrocarbonaceous material from which the hydrocarbon-containing fluid is produced such that production of the hydrocarbon-containing fluid and removal of fines occurs contemporaneously. Alternatively, in some cases the bed media can be configured as a dedicated fines removal bed.

Through processing in this manner, the fines content of the hydrocarbon-containing fluid is slowly reduced. Advantageously, the filtered hydrocarbon-containing fluid can have substantially reduced or eliminated fines content.

Additional features and advantages of the invention will be apparent from the following detailed description, which illustrates, by way of example, features of the invention.

Figure 1:
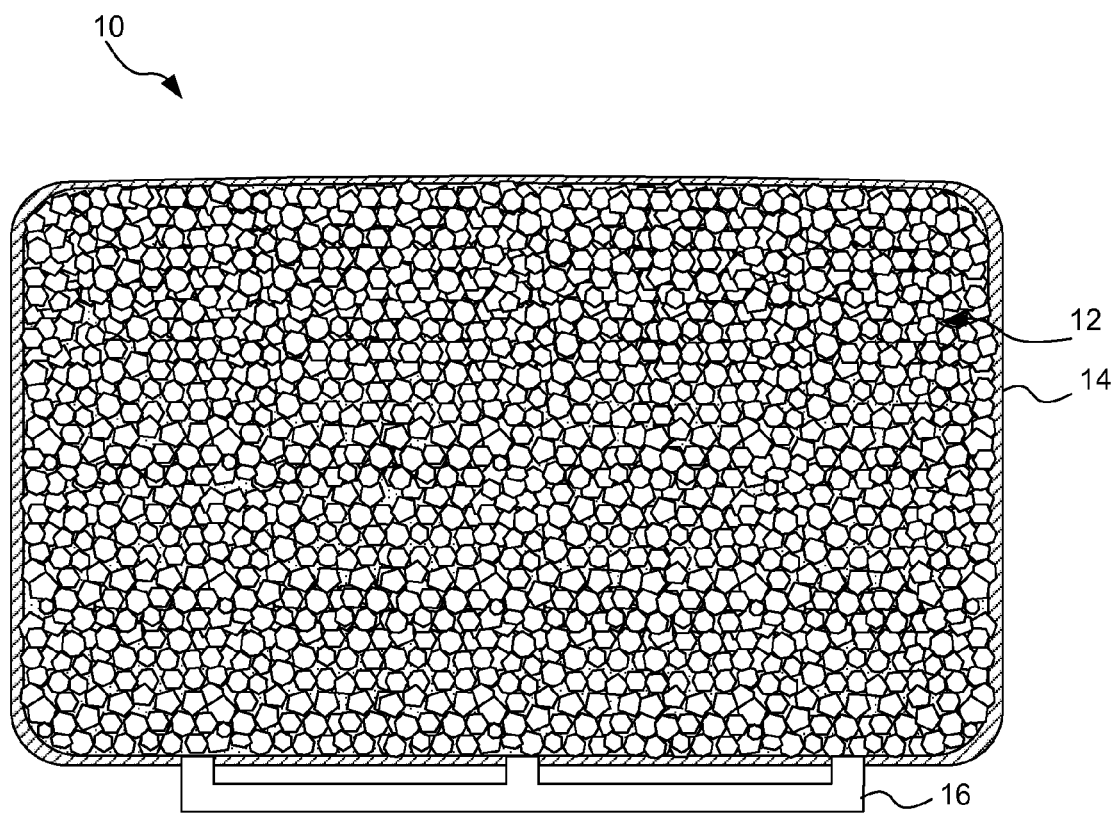
FIG. 1 is a cross-section of a system for removing fines from a hydrocarbon-containing fluid while simultaneously producing the fluid.

Dimensions, materials and configurations are presented in the figures merely for convenience in describing the invention and may not represent accurate relative proportions or alternative variations which are considered part of the invention. Some aspects may be exaggerated or vary from practicing embodiments in order to facilitate clarity.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

Definitions

In describing and claiming the present invention, the following terminology will be used.

The singular forms "a," "an," and "the" include plural references unless the context clearly dictates otherwise. Thus, for example, reference to "an inlet" includes reference to one or more of such structures, "a particulate" includes reference to one or more of such materials, and "a passing step" refers to one or more of such steps.

As used herein, "adsorption" refers to adherence of fines to a material via surface interactions largely driven by surface energy differences and can include physisorption and chemisorption.

As used herein, "filtration" refers to removal of fines from a fluid via entrapment in pores or openings in the filter media which are smaller than the size of the fine.

As used herein, "fines" refer to solid particulate material which is suspended in a fluid and has a size of less than about 0.2 mm. Fines smaller than about 0.1 mm tend to be liberated or produced during processing of a hydrocarbonaceous material from which a hydrocarbon fluid is produced. Particles less than 20 µm in diameter are often present in abundance.

As used herein, "hydrocarbonaceous material" refers to any hydrocarbon-containing material from which hydrocarbon products can be extracted or derived. For example, hydrocarbons may be extracted directly as a liquid, removed via solvent extraction, directly vaporized or otherwise removed from the material. However, many hydrocarbonaceous materials contain kerogen, bitumen or various grades of coal which can be converted to a smaller molecular weight hydrocarbon liquid or gas through heating and pyrolysis. Hydrocarbonaceous materials can include, but is not limited to, oil shale, tar sands, coal, lignite, bitumen, peat, and other organic materials.

As used herein, "lean material" or similar terminology refers to a treated hydrocarbonaceous material, such as oil shale, tar sands, and the like, from which some or all of the hydrocarbons have been removed.

As used herein "bentonite amended soil" or "BAS" refers an optional seal layer formed of clay, water and soil or aggregate. BAS typically comprises, by weight, about 6-12% bentonite clay; 15-20% water mixed with soil or aggregate.

As used herein, "wetting film" refers to a fluid film which is wetted across a particle. A wetting film involves at least partial coating of a surface. The thickness and degree of coating is a function of numerous variables, including but not limited to, temperature, flow rates, fluid properties (e.g. viscosity), particle surface properties (e.g. porosity, surface energy, roughness, etc.), and interfacial properties (e.g. interfacial surface energy, electrostatic interactions, etc.). A wetting film also results in void spaces between some neighboring wetted particles although immediately adjacent particles may share a common film.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the results of the composition.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, and sub-ranges such as 10 to 50, 20 to 100, etc.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Removing Fines from Hydrocarbon-Containing Fluids

A method of removing fines from a hydrocarbon-containing fluid can include preparing a bed media of particulate earthen material. The hydrocarbon-containing fluid having fines therein can be passed through the bed media at a flow rate such that a portion of the fines are retained in the bed media to form a filtered hydrocarbon-containing fluid. The flow rate is sufficient to maintain a wetting film of the hydrocarbon-containing fluid across at least a majority portion of the particulate earthen material which is contacted by the hydrocarbon-containing fluid. The filtered hydrocarbon-containing fluid can be recovered from the bed media.

The bed media can be the hydrocarbonaceous material from which the hydrocarbon-containing fluid is produced such that production of the hydrocarbon-containing fluid and removal of fines occurs contemporaneously. FIG. 1 illustrates such a case where a system 10 for removing fines from a hydrocarbon-containing fluid includes a gravity drain bed 12. The gravity drain bed has a bed media of hydrocarbonaceous material which is initially hydrocarbon-rich. The bed can be partially or completely enclosed. In some applications, the bed media can be at ambient pressures and/or exposed to open conditions. Alternatively, the bed media can be substantially fully enclosed by a suitable encapsulation barrier 14. This barrier can be any suitable barrier which prevents undesirable passage of fluids into or out of the bed media. Non-limiting examples of suitable barriers can include bentonite amended soil, concrete, steel, composites or the like. Optional additional internal layers can also be provided to form a multi-layer system. For example, an additional particulate layer can be formed to provide a thermally insulative barrier where vapors can be cooled and condensed within an outer fluid barrier layer (e.g. bentonite amended soil).

As the appropriate conditions are maintained (i.e. depending on the type of hydrocarbonaceous material), a hydrocarbon-containing fluid is produced which flows throughout the bed media. These conditions generally involve heating for a specified period of time. For example, an oil shale material can be heated at a temperature from about 200° F. to about 700° F. At these temperatures, kerogen within the oil shale is pyrolyzed to form hydrocarbons. Similar conditions can also be customized and applied to tar sands, coal, and other hydrocarbonaceous materials. Typically, both gases and liquids are produced during such processes. However, liquids will contain the undesirable fines. The liquids flow through the particulate bed media by gravity drain to a fluid outlet 16. The nature of this flow is described in more detail below but is carefully controlled so as to allow a wetting film to be maintained across at least portions of the bed media. The fluid outlet can be configured to allow collection of filtered hydrocarbon-containing fluid for transport and/or further processing. This approach can be an effective method to produce a useful hydrocarbon product and simultaneously withdraw problematic fines from the hydrocarbon product.

Figure 2:
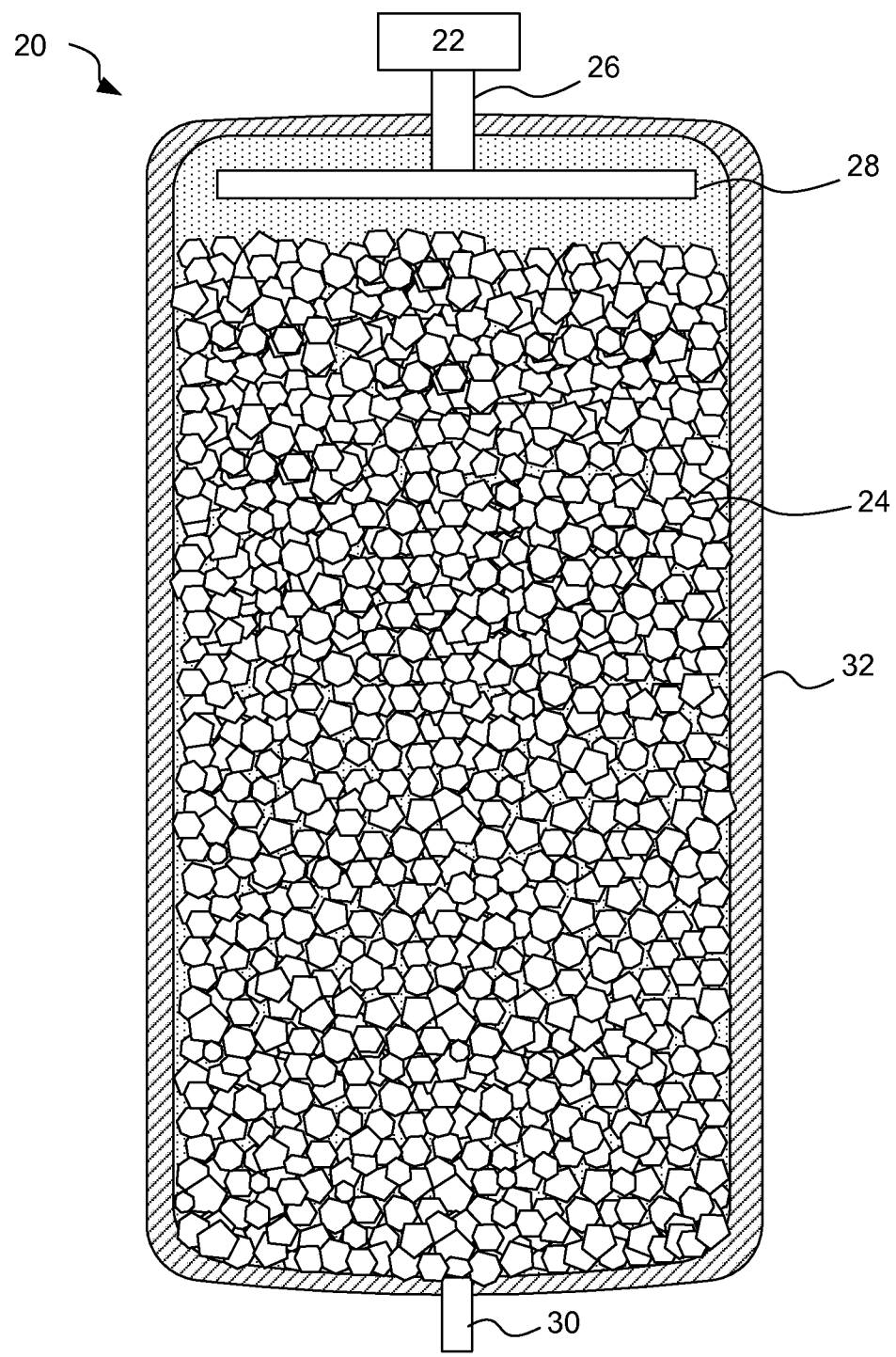
FIG. 2 is a cross-section of a system for removing fines from a hydrocarbon-containing fluid subsequent to production of the fluid.

Alternatively, in some cases the bed media can be configured as a dedicated fines removal bed. This can be useful, for example, when the production step for the hydrocarbon-containing fluid does not involve suitable earthen material and/or when other processing considerations prevent the desired conditions for formation of a wetting film. In these cases, the hydrocarbon-containing fluid is introduced into the bed media subsequent to production of the hydrocarbon-containing fluid from a corresponding hydrocarbonaceous material. FIG. 2 illustrates a dedicated fines removal system 20. A hydrocarbon-containing fluid source 22 can provide hydrocarbon-containing fluid which is passed through the bed media 24. A fluid delivery inlet 26 can be configured to allow introduction of the hydrocarbon-containing fluid from the source into the bed media. Although not required, the inlet can also include a diffuser 28 or other similar mechanism to distribute the hydrocarbon-containing fluid across the bed media. Such a diffuser can help to increase fluid contact surface area by reducing channeling and unused portions of the bed media. In FIG. 2, an outlet 30 can be used to withdraw fluids from the bed media. Optionally, the system can include a barrier 32 which includes a sloped bottom to facilitate collection of fluids.

The bed media can be any particulate earthen material which adsorptively binds with the fines from the hydrocarbon-containing fluid. The specific choice of bed media can depend on the nature of the hydrocarbon-containing fluid and associated processing conditions. However, non-limiting examples of suitable particulate earthen material can include oil shale, tar sands, coal, soil, and combinations of these materials. In one aspect, the particulate earthen material can be oil shale. Either lean (e.g. spent) or unspent materials can be suitable. Although not always required, the hydrocarbon-containing fluid can be produced from a hydro carbonaceous material where the particulate earthen material is of the same material type as the hydrocarbonaceous material. For example, shale oil can be passed through oil shale or tar sand oil passed through tar sands.

The particulate earthen material can have an average size which is effective to provide surface area across which the hydrocarbon-containing fluid can flow. Although other dimensions may be suitable, generally the material has an average size from about 0.06 mm to about 1 m. In one aspect, the average size is from about 2 cm to about 1 m (e.g. oil shale or coal). In another aspect, the average size is from about 0.06 mm to about 5 mm (e.g. tar sand).

The hydrocarbon-containing fluid can be any hydrocarbon fluid which has undesirable fines contained therein. Non-limiting examples of hydrocarbon-containing fluids include shale oil, tar sand tailings, coal liquefaction products, and combinations thereof. Shale oil can be produced using any suitable technique including, but not limited to, In Capsule (U.S. application Ser. No. 12/028,569 which is incorporated herein by reference), surface retort, in situ, or the like. Tar sand tailings can be most commonly formed from the well known caustic hot water process. Coal liquefaction products can be obtained using a variety of methods including, but not limited to, solvent extraction, carbonization, hydrogenation, and the like. Many of these liquefaction products include substantial silica fines liberated from the source coal during conversion. Thus, the hydrocarbon-containing fluid source can be an oil shale system, a tar sand system (or tar sand tailing pond), a coal liquefaction system, or any other hydrocarbon production system which leaves fines in the hydrocarbon product or other by-product streams.

As the hydrocarbon-containing fluid flows through the media bed, the flow rate is kept so as to maintain a wetting film of the hydrocarbon-containing fluid across the particulate earthen material. This can be controlled by adjusting various variables, for example, earthen material particle size, withdrawal flow rates, and the like. In the case of simultaneous production and fines removal, the heating rate, pressure, and heat flux, can be adjusted. Similarly, in the case of dedicated removal beds, the inlet flow rate of fluid, bed particle size and bed temperature can be varied. Regardless, the wetting film can cover at least a portion of the particulate earthen material. Although efficiency is generally desirable to utilize as much surface area as possible, less than the entire media bed may be used. Generally, at least a majority portion of the particulate earthen material which is contacted by the hydrocarbon-containing fluid can be covered by a wetting film.

Although film thickness can vary with location and specific conditions, the film thickness and flow rate along the film can be sufficient to allow mass transfer of fines to the surface of the particulate earthen material. The fines diffusively migrate across the film to the surface. Often the fines are attracted to the surface due to electrostatic interactions, although other forces can contribute to attraction. Conditions within the particulate earthen material can be maintained such that the wetting film thickness does not exceed an equilibrium film thickness. The equilibrium film thickness corresponds to a film thickness which occurs when no additional oil is added and the film is at a steady state, i.e. not decreasing. Non-uniform conditions are typically present throughout the particulate earthen material. However, in one aspect, equilibrium film thickness is not exceeded over at least 10% by volume of the earthen material. In some cases, the equilibrium film thickness is not exceeded over at least 30% by volume of the earthen material. The wetting film can typically have a thickness less than about 1 mm, and often less than about 0.5 mm. However, it is understood that these thicknesses can be a function of viscosity and other variables. Further, the method can be relatively slow to allow a high surface area contact with large volumes of the fluid. In one aspect, the flow rate is sufficient to provide a residence time of the hydrocarbon-containing fluid from about 2 days to about 4 months. This system can employ once through fluid flow or the fluid can be repeatedly circulated through the bed to increase fines removal. As a general rule, maintaining conditions where equilibrium film thickness is not exceeded can involve controlled slow initial heating of the earthen material. As a result, extended heating times can range from several weeks to several months. Heating can be provided using any suitable heating source. Generally, a heat source can be thermally associated with the bed media of earthen material. Non-limiting examples of suitable heating sources can include combustors, heating conduits embedded in the bed media, convective heat gas source, electrical resistance heaters, combinations of these sources, and the like.

The bed media can have any shape which is functional to allow fluid to contact and flow through the particulate earthen material. Internal baffles or other means can be used to direct fluid flow and increase surface area contact with the particulate earthen material. Although almost any depth may be functional, the bed media often has a vertical depth from about 1 meter to about 40 meters. Furthermore, the bed media can be substantially stationary during the passing the hydrocarbon-containing fluid through the bed media. Although additives may be used, in one aspect, the bed media can be substantially free of synthetic materials. Through maintaining a wetting film, retention of the portion of fines in the bed media is primarily through adsorption rather than filtration.

The hydrocarbon-containing fluid ultimately is slowly reduced in fines content. The degree of removal is a function of film thickness and residence time, among other factors. Advantageously, the filtered hydrocarbon-containing fluid can have substantially reduced fines content. In some aspects, the filtered hydrocarbon-containing fluid can be substantially free of fines.

It is to be understood that the above-referenced arrangements are illustrative of the application for the principles of the present invention. Thus, while the present invention has been described above in connection with the exemplary embodiments of the invention, it will be apparent to those of ordinary skill in the art that numerous modifications and alternative arrangements can be made without departing from the principles and concepts of the invention as set forth in the claims.

What is claimed is:

1. A method of removing fines from a hydrocarbon-containing fluid, comprising:
   a. preparing a bed media of particulate earthen material;
   b. passing the hydrocarbon-containing fluid having fines therein through the bed media at a flow rate such that a portion of the fines are retained in the bed media to form a filtered hydrocarbon-containing fluid, said flow rate being sufficient to maintain a wetting film coated on individual particles of the particulate earthen material, the wetting film comprising a liquid of the hydrocarbon-containing fluid across at least a majority portion of the particulate earthen material which is contacted by the hydrocarbon-containing fluid; and
   c. recovering the filtered hydrocarbon-containing fluid from the bed media.

2. The method of claim 1, wherein the passing the hydrocarbon-containing fluid includes introducing the hydrocarbon-containing fluid into the bed media subsequent to production of the hydrocarbon-containing fluid from a hydrocarbonaceous material.

3. The method of claim 1, wherein the hydrocarbon-containing fluid is produced from a hydro carbonaceous material and the particulate earthen material is of the same material type as the hydrocarbonaceous material.

4. The method of claim 1, wherein the particulate earthen material is selected from the group consisting of oil shale, tar sands, coal, and combinations thereof.

5. The method of claim 1, wherein the particulate earthen material is oil shale.

6. The method of claim 1, wherein the particulate earthen material has an average particle diameter from about 0.06 mm to about 1 m.

7. The method of claim 6, wherein the average size particle diameter is from about 2 cm to about 1 m.

8. The method of claim 6, wherein the average size particle diameter is from about 0.06 mm to about 5 mm.

9. The method of claim 1, wherein the hydrocarbon-containing fluid is selected from the group consisting of shale oil, tar sand tailings, coal liquefaction product, and combinations thereof.

10. The method of claim 1, wherein the wetting film has a thickness less than about 1 mm.

11. The method of claim 1, wherein the flow rate is sufficient to provide a residence time of the hydrocarbon-containing fluid from about 2 days to about 4 months.

12. The method of claim 1, wherein at least a portion of the wetting film has a thickness which does not exceed an equilibrium film thickness.

13. The method of claim 12, wherein the portion of the wetting film is at least 10% by volume of the particulate earthen material.

14. The method of claim 1, wherein the bed media is substantially stationary during the passing the hydrocarbon-containing fluid through the bed media.

15. The method of claim 1, wherein retention of the portion of fines in the bed media is primarily through adsorption rather than filtration.

16. The method of claim 1, wherein the filtered hydrocarbon-containing fluid is substantially free of fines.

17. The method of claim 1, wherein the fines have an average particle diameter of less than about 0.2 mm.

18. The method of claim 1, wherein the fines have an average particle diameter of less than about 20 μm.

19. The method of claim 1, wherein the bed media has a vertical depth from about 1 m to about 40 m.

20. The method of claim 1, wherein void spaces are present between at least a majority of neighboring wetted particles.

21. A method of removing fines from a hydrocarbon-containing fluid, comprising:
   a. preparing a bed media of particulate hydrocarbonaceous material;
   b. producing a hydrocarbon-containing fluid having fines therein from the particulate hydrocarbonaceous material such that while the production is occurring the hydrocarbon-containing fluid passes through the bed media at a flow rate such that a portion of the fines are retained in the bed media to form a filtered hydrocarbon-containing fluid, said flow rate being sufficient to maintain a wetting film coated on individual particles of the particulate earthen material, the wetting film comprising a liquid of the hydrocarbon-containing fluid across at least a majority portion of the particulate hydrocarbonaceous material which is contacted by the hydrocarbon-containing fluid; and
   c. recovering the filtered hydrocarbon-containing fluid from the bed media.

* * * * *